United States Patent [19]

Formato

[11] 4,255,976

[45] Mar. 17, 1981

[54] APPARATUS AND METHOD FOR MEASURING THE VELOCITY OF A MOVING DIELECTRIC MATERIAL

[75] Inventor: Richard A. Formato, Shrewsbury, Mass.

[73] Assignee: Theodore P. Zoli, Jr., Glens Falls, N.Y.

[21] Appl. No.: 76,152

[22] Filed: Sep. 17, 1979

Related U.S. Application Data

[63] Continuation-in-part of Ser. No. 065,831, Aug. 13, 1979, abandoned.

[51] Int. Cl.³ .......................... G01F 1/56; G01F 3/52
[52] U.S. Cl. .................................. 73/861.08; 324/166; 324/176
[58] Field of Search ..................... 73/861.08, 861.14; 324/166, 176

[56] References Cited

U.S. PATENT DOCUMENTS

| 3,178,941 | 4/1965 | Berry | 73/861.14 |
| 3,478,261 | 11/1969 | Forster et al. | 73/861.08 |
| 3,528,287 | 9/1970 | Melcher | 73/861.08 |

*Primary Examiner*—Herbert Goldstein
*Attorney, Agent, or Firm*—Joseph S. Iandiorio

[57] ABSTRACT

An apparatus and a method for measuring the velocity of a moving dielectric material including establishing an electric field within the dielectric material to polarize the material; establishing a magnetic field within the dielectric material to induce a velocity-dependent torque on the electric dipole moments tending to align the electric dipole moments perpendicular to both the direction of motion of the dielectric material and to the direction of the magnetic field; detecting the change in the polarization of the moving dielectric material induced by the magnetic field; and determining the velocity of the moving dielectric material in response to the detected change in polarization.

25 Claims, 10 Drawing Figures

APPARATUS AND METHOD FOR MEASURING THE VELOCITY OF A MOVING DIELECTRIC MATERIAL

CROSS REFERENCE

This application is a Continuation in Part of co-pending application Ser. No. 065,831, filed Aug. 13, 1979, now abandoned.

FIELD OF INVENTION

This invention relates to an apparatus and a method for measuring the velocity of a moving dielectric material, and for measuring fluid flow as a function of that velocity.

BACKGROUND OF INVENTION

Conventional fluid flow meters which measure fluid flow velocity, flow volume and the like, such as those used in water meters, gasoline pumps, petroleum refineries, chemical plants and power plants, are typically mechanical devices. These devices usually employ moving parts to measure the flow and are often complex. The mechanical parts wear and foul, requiring repair and replacement.

SUMMARY OF INVENTION

It is therefore an object of this invention to provide an improved and simplified apparatus and method for measuring the velocity of dielectric fluids.

It is a further object of this invention to provide such an improved apparatus and method which measures flow as a function of that velocity.

It is a further object of this invention to provide such an improved apparatus and method which measures velocity of solid as well as fluid dielectric materials.

It is a further object of this invention to provide such an improved apparatus and method which requires no moving parts.

The invention results from the realization that in a moving dielectric material which is polarized by an electric field, the change in the material's polarization induced by a magnetic field is a function of the velocity of that dielectric material relative to the magnetic field and that that change in polarization can be used to determine the velocity of the dielectric material.

The invention features a method and apparatus for measuring the velocity of a moving dielectric material. An electric field is established within the dielectric material to align the permanent electric dipole moments of a polar material or to induce an electric moment by charge displacement in a non-polar dielectric, i.e. polarize the material. A magnetic field is established within the dielectric material to induce a velocity-dependent torque on the electric dipole moments tending to align the dipole moments perpendicular to both the direction of motion of the dielectric material and the direction of the magnetic field. The change in the material's polarization induced by the magnetic field is detected. From the detected change in polarization the velocity of the moving dielectric material is determined. The flow of the material may then be provided.

In a preferred apparatus embodiment of the invention there are a plurality, at least a set, of spaced electrodes and a source of electric potential for energizing the electrodes to provide the electric field. The magnetic field may be provided by e.g. a permanent magnet, an electromagnet, or a solenoid. The change in polarization may be detected by means for measuring the capacitance of the system formed by the moving dielectric material and electrodes which produce the electric field. The spaced electrodes may perform the function of the capacitor plates. Once the change in polarization or some related physical property, such as the capacitance, is detected, the value so detected may be decoded to determine the velocity. The magnetic field may be anti-parallel, that is parallel but with the opposite sense of direction, to the electric field. Other relative orientations of the electric and magnetic fields are also possible. The electric and magnetic fields may be time varying or constant. Various techniques may be used for detecting the change in polarization induced by the magnetic field, including measuring the capacitance of the system formed by the dielectric material between a set of conducting plates, in which case, for example, the electrodes may also function as capacitor plates; by measuring the dielectric constant of the dielectric material; or by measuring the electric field within the dielectric material. The dielectric material may be either a solid, for example a paper or fabric sheet, or a fluid, for example water or a petroleum product or a gaseous material.

DISCLOSURE OF PREFERRED EMBODIMENT

Other objects, features and advantages will occur from the following description of a preferred embodiment and the accompanying drawings in which.

Figure 1:
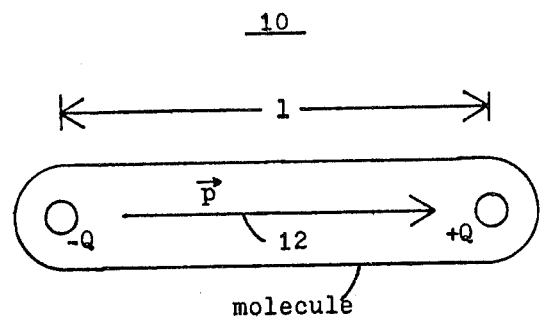
FIG. 1 is a schematic representation of a typical polar molecule, e.g. water.

Dielectric (i.e., essentially non-conducting) materials may be broadly classified into two groups: non-polar materials (Class I) which acquire an electric dipole moment by induction upon application of an external electric field (i.e., an impressed field); and polar materials (Class II), such as water ($H_2O$), which possess a permanent electric dipole moment as a result of the molecular geometry. Application of an external electric field to a Class I material produces a displacement of the individual atomic or molecular electric charge, which gives rise to an electric moment which tends to align itself along the impressed field. This phenomenon is referred to as "distortion polarization." Application of an external electric field to a Class II material tends to align the individual permanent dipole moments along the direction of the applied field. This phenomenon is referred to as "orientation polarization." The accepted theory of this effect models the intrinsic electric dipoles as rigid bodies and is described in *Polar Molecules* by P. Debye, Dover Publications, Inc., New York, No. S64 (first published in 1929). Another useful reference is *The Nature of the Chemical Bond*, L. Pauling, Third Edition, Cornell University Press, Ithaca, N.Y. 1972 (in particular Appendix IX). Both the distortion and orientation mechanisms are referred to as "polarization", and real dielectric materials generally exhibit some degree of each effect. The orientation and distortion effects are distinguished by the fact that the former is temperature dependent while the latter is not. Class II materials therefore exhibit a temperature dependent polarization, while Class I materials do not. As a practical matter, it is only this temperature dependence that differentiates the two classes of dielectric materials (see, for example, *Electromagnetic Fields and Waves*, P. Lorrain and D. Corson, Second Edition, W. H. Freeman and Company, 1970, Chapter 3).

When a dielectric material is inserted between the plates of a capacitor, for example, the electric field established between the plates by some source of electric potential tends to align the individual atomic or molecular dipole moments along the direction of the impressed electric field, i.e. to polarize the dielectric material, which results in a reduction of the electric field between the plates and a consequent increase in the capacitance of the system. The extent to which the capacitance is increased by the presence of a stationary dielectric material is measured by the material's dielectric constant. By dielectric material is meant a substance which is not a good electrical conductor. The method described here may be effectively employed with materials exhibiting a wide range of conductivities, polarizabilities and intrinsic permanent dipole moment. As a general reference see *Physics Part II*, D. Halliday and R. Resnick, Second Edition, John Wiley & Sons, Inc., New York, 1963.

Electric charge interacts with an external electric field regardless of its state of motion relative to the field; that is, a force is always produced on the charge by an electric field. Moving electric charge also interacts with an external magnetic field. Charge which is at rest relative to an external magnetic field, however, experiences no magnetic force. These facts may be usefully employed in a velocity measuring system by simultaneously applying electric and magnetic fields to a material and measuring the velocity dependent effects which these fields produce in the material. The Lorentz Force Law expresses the total force, which includes an electric force and a magnetic force, acting upon a charged particle which is in motion in a region of space permeated by both an electric and a magnetic field. As pointed out above, the electric force is independent of the charged particle's velocity relative to the fields, while the magnetic force is not. An electric dipole, which consists of two equal and opposite electric charges separated by some small distance, in motion relative to external electric and magnetic fields also interacts with these fields. The electric interaction produces a velocity-independent torque on the dipole which tends to align the dipole axis along the direction of the impressed electric field, since this orientation corresponds to minimum potential energy for the dipole. The magnetic interaction produces a torque which depends upon the velocity of the dipole relative to the impressed magnetic field and which tends to align the dipole axis along a direction perpendicular to both the direction of motion of the dipole and the direction of the magnetic field, which again corresponds to minimum potential energy for the dipole. The relative magnitude of the magnetic and electric effects is measured by the dimensionless ratio ($BV/E$), where $B$, $V$, and $E$ are the magnitudes of the magnetic induction, the velocity and the electric field intensity, respectively. When this ratio is very small (large), the electric (magnetic) effect is dominant. When this ratio is order one, however, the electric and magnetic effects are of comparable magnitude. This condition is readily achieved with reasonable values of $B$, $V$ and $E$. For example, if $V=1$ meter/sec, the ratio ($BV/E$) is one for $B=0.1$ weber/$m^2$ and $E=0.1$ volt/meter, both of which are easily attained. In this case, the torques produced on a moving electric dipole by external electric and magnetic fields would be of the same magnitude. By suitably arranging the relative spatial orientation of the impressed electric and magnetic fields, a velocity-dependent effect on a dielectric material's dipole orientation, i.e. polarization, may be measured from which the material's velocity may be deduced.

A moving dielectric material placed between the plates of a capacitor, for example, and subjected to a properly oriented magnetic field in addition to the electric field established between the plates, therefore exhibits a different degree of polarization than it would if stationary, since the tendency of the electric field to produce alignment of the electric dipole moments, for example, may be partially offset or assisted by the torque resulting from the magnetic field. The change in polarization induced by the magnetic field, moreover, depends upon the velocity of the dielectric material relative to the magnetic field and may be manifested as a change in the material's effective dielectric constant. By measuring the dielectric constant of the moving dielectric material (or, equivalently, the capacitance of the system or the electric field within the material), the velocity of the moving material may be deduced.

In applying this principle to the measurement of fluid flow a region of known cross-sectional area through which the fluid flows may be subjected to properly oriented electric and magnetic fields. The velocity of the fluid is measured in accordance with the mechanisms described above, from which the flow rate (volume flux) and total amount of fluid passing through the region between specified times may be computed. The term "measurement of flow" as used here refers to the measurement of flow velocity or of any derived physical parameter (volume/mass flux, total volume or mass, and so on). This entire process may be implemented electronically, for example, to provide a completely non-mechanical system for the measurement of fluid flow. Alternatively, it may employ a combination of electronic and/or mechanical components. It may be usefully employed, for example, as a water meter for domestic and commercial use, as a metering system for gasoline in the typical gas pump, as a metering system in process control applications in chemical plants, oil refineries, paper and fabric mills or power generating plants for measuring fluid flow. It may also be usefully employed as a sensing device in critical flow alarm or control systems as, for example, in monitoring the coolant flow in nuclear power generating plants.

There is shown in FIG. 1 a typical polar molecule 10 of a material such as water possessing a permanent electric dipole moment. Each polar molecule 10 may be visualized as including two equal and opposite electric charges, $+Q$ and $-Q$, rigidly separated by some small distance, 1; that is, an elementary electric dipole. The product $1Q$ is the magnitude of the electric dipole moment designated by the symbol p. $\vec{p}$ is a vector quantity lying along a line joining the two charges $+Q$ and $-Q$, pointing toward the positive charge as indicated at 12.

Figure 2:
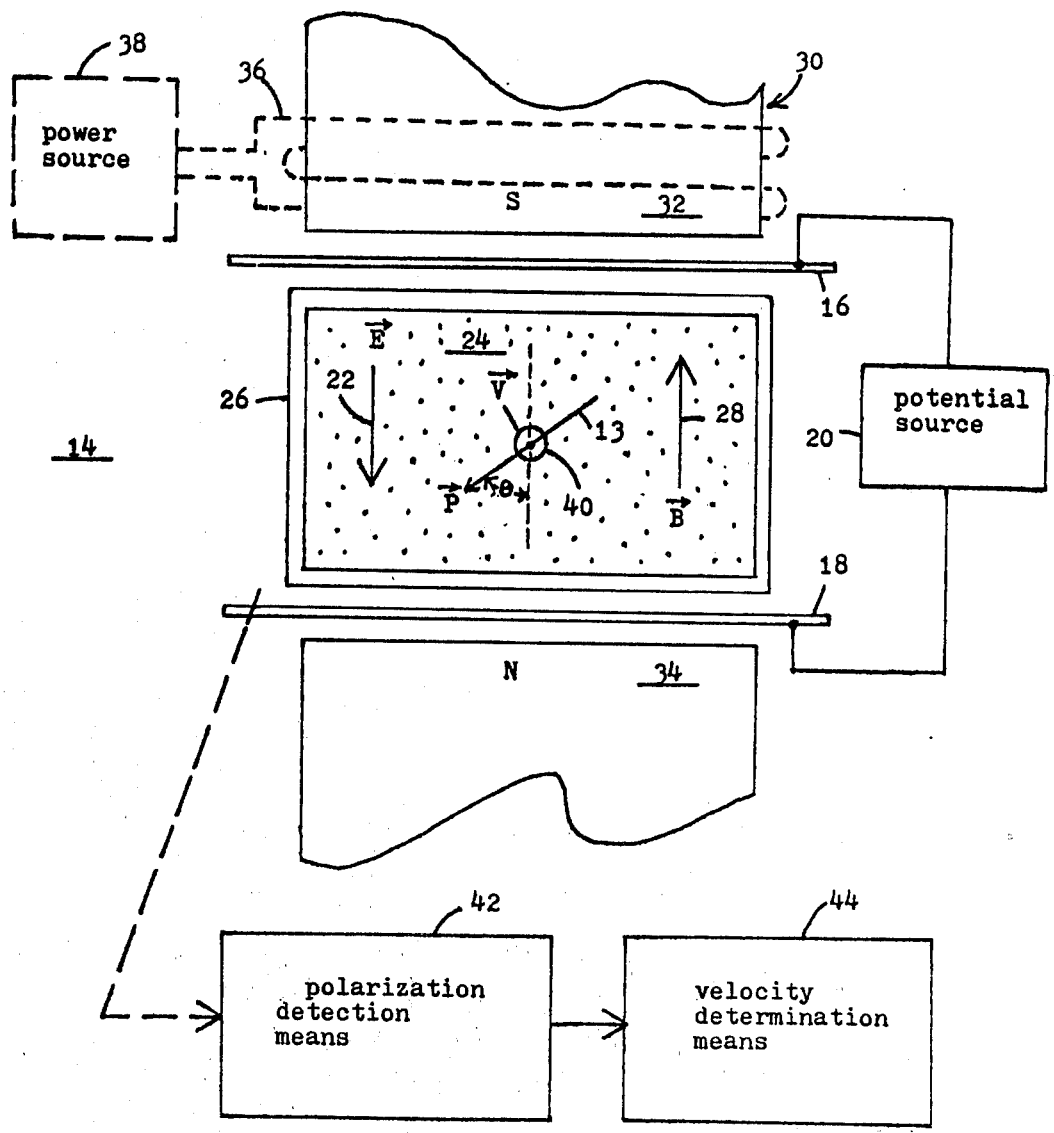
FIG. 2 is a simplified block diagram of a velocity measuring system according to this invention.

A system 14 for measuring the velocity of a moving dielectric fluid is shown in FIG. 2 consisting of a pair of electrodes 16, 18, energized by a potential source 20 to provide between those plates an electric field $\vec{E}$, as indicated at 22, in dielectric fluid 24 in pipe 26. A magnetic induction $\vec{B}$, as indicated at 28, is also produced in fluid 24 by means of permanent magnet 30 having a south pole 32 and north pole 34. Alternatively, magnet 30 may be an electromagnet energized by coil 36 driven by power source 38, or it may be a solenoid.

In FIG. 2 the dielectric fluid 24 flows out of the page with the velocity $\vec{V}$ as indicated at 40, and the electric field $\vec{E}$ and the magnetic field $\vec{B}$ are oriented anti-parallel to each other. Other relative orientations of $\vec{E}$ and $\vec{B}$ are also possible. Either or both the electric and magnetic fields may be time varying or constant in time. The walls of pipe 26 may be constructed of a non-conductive material such as plastic.

$\vec{P}$, 13, of the dielectric fluid 24, at a typical point within the fluid, represents the electric dipole moment per unit volume. Note that $\vec{P}$, 13, and $\vec{p}$, 12, in FIG. 1, are not the same quantities. $\vec{P}$, 13, is inclined at an angle $\theta$ relative to the direction of the electric field $\vec{E}$ as a result of the velocity-dependent depolarizing torque produced by the magnetic field $\vec{B}$. If $\vec{B}$ is zero or if the flow velocity is zero, the angle $\theta$ is also zero. In this case $\vec{P}$ is parallel to $\vec{E}$ because the magnetic field produces no depolarizing torque. As $\vec{V}$ increases from zero with $\vec{E}$ and $\vec{B}$ held constant, however, the angle $\theta$ also increases from zero since a velocity-dependent torque on $\vec{P}$ is then produced by the magnetic field $\vec{B}$. For $\vec{V}$ growing arbitrarily large, the angle $\theta$ approaches 90°. The angle $\theta$ bears a unique relationship to the flow velocity V and it determines the effective polarization or equivalently the effective dielectric constant of the dielectric material in motion. In this typical implementation, the electric and magnetic fields are chosen to be anti-parallel, which results in a depolarization of the dielectric material as a result of its motion through the magnetic field. This is not a limitation, however, since other relative orientations of the electric and magnetic fields are also possible which may, for example, increase the material's degree of polarization.

The change in the polarization of fluid 24 is detected by polarization detection means 42. From the detected polarization, the velocity determination means 44 determines the velocity of the dielectric fluid 24. System 14, FIG. 2, may be implemented to provide any desired flow measurement parameter, e.g. velocity, volume flux, or total volume over a defined period. If the cross-section of pipe 26 is known, the flow volume flux may also be detected, and by the introduction of a timer or integrator means the total flow volume over discrete periods of time may also be determined. The polarization detection means may include any means which directly or indirectly senses the effect of the magnetic field and velocity of the dielectric material on the electric dipole moments, e.g. means for detecting the change in capacitance, change in dielectric constant, or change in the electric field within the dielectric material, as compared to those parameters when the dielectric material is stationary. The dielectric constant of the moving material may, for example, be measured by measuring the refractive index of the material by illuminating it with a suitable beam of radiant energy (electromagnetic radiation) and applying Snell's law which relates the incidence and refraction angles and the refractive index. The refractive index at a particular frequency, in turn, is equal to the square root of the dielectric constant. For materials whose dielectric constant is large compared to unity when stationary (water for example has a stationary dielectric constant of approximately 78), the percentage change in the dielectric constant or equivalently the capacitance, or electric field within the fluid resulting from flow velocity $\vec{V}$ is given approximately by the expression:

% change in dielectric constant or capacitance or electric field $\simeq 100 \cdot (1-F)$ where F is defined as $(1+BV/E)^2)^{-\frac{1}{2}}$ B, E, and V are magnitudes of the magnetic field, the electric field, and the flow velocity, respectively. The formula above applies to the field orientation in FIG. 2 in the idealized case of an infinite fluid moving with a spatially uniform velocity, imbedded in uniform $\vec{E}$ and $\vec{B}$ fields. In addition, the individual atomic or molecular dipoles are modeled as rigid bodies. In actual practice, the fluid exhibits some non-uniformity in its velocity profile as a result of viscosity and, additionally, the $\vec{E}$ and $\vec{B}$ fields include fringing, which are not taken into account in this illustrative example. These deviations from the ideal case render the above formula only approximate. It serves, nevertheless, to illustrate the magnitude of the observed effects due to the motion of a dielectric material through a region permeated by electric and magnetic fields. In actual practice, an empirical determination should be made of the relationship between B, V, E, and, for example, the observed change in capacitance.

The following table illustrates the magnitude of depolarizing effect induced by the magnetic field upon the moving dielectric material as computed from the above formula for the system of FIG. 2:

| Ratio (BV/E) | % Change in Dielectric Constant or Capacitance or Electric Field |
| --- | --- |
| 0 | 0 |
| 1 | 29 |
| 2 | 55 |
| 3 | 68 |
| 4 | 76 |
| 5 | 80 |
| 10 | 90 |
| 20 | 95 |
| 50 | 98 |

Thus polarization detection means 42 need only detect the change in dielectric constant or capacitance or electric field. Once that fractional change is detected as shown in the table above, the corresponding ratio BV/E is calculated or retrieved from a storage system (magnetic core or solid-state memory, for example) in velocity determination means 44; and the velocity is determined.

In a typical domestic waterfeed system the maximum flow velocity is on the order of 0.2 meters/sec so that large values of BV/E may be obtained with the magnetic field B equal to 0.1 weber/m$^2$ and electric field E equal to $2\times10^{-3}$ volt/m, for example, both of which are readily attainable values.

Figure 3:
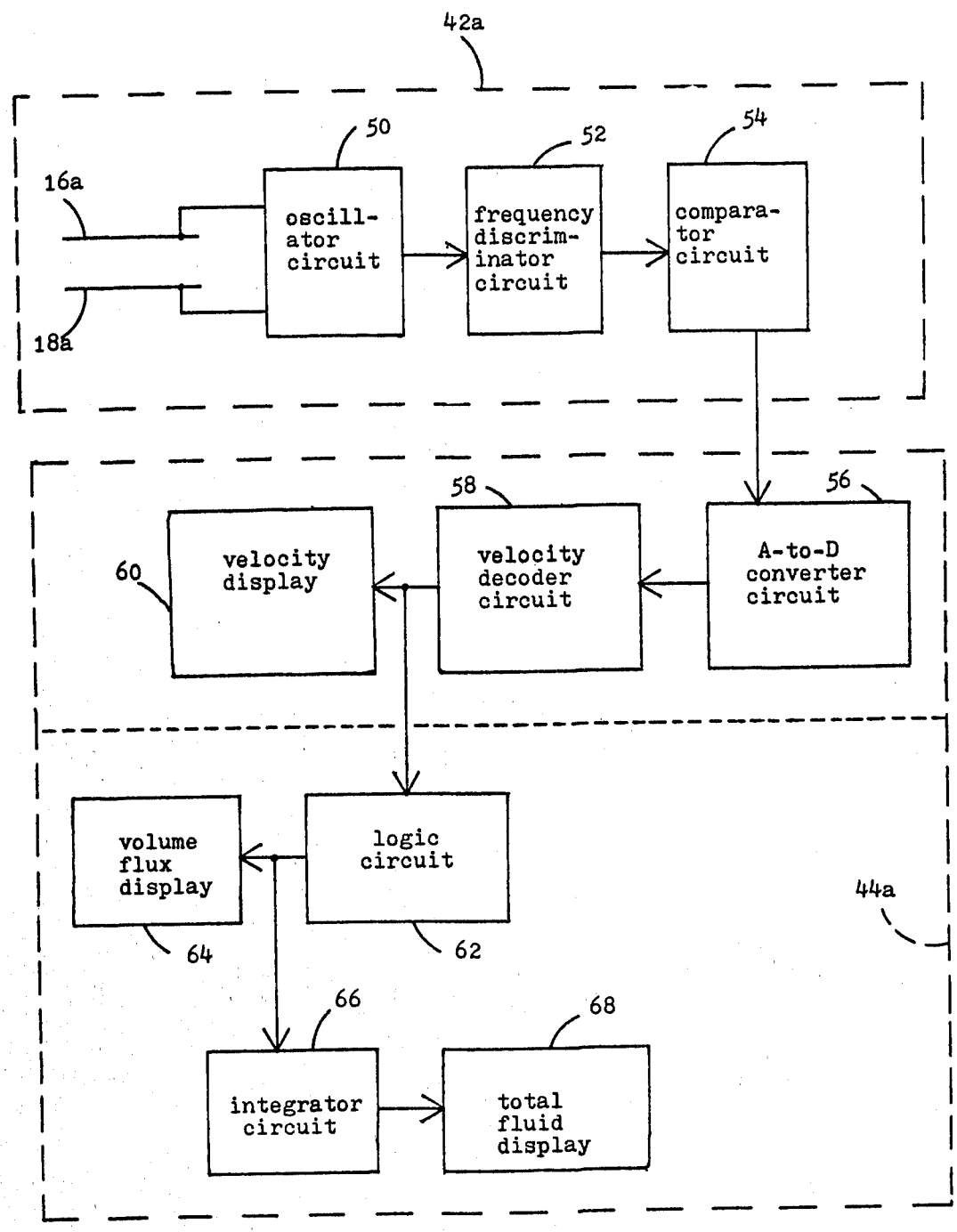
FIG. 3 is a more detailed block diagram of portions of FIG. 2.

In a specific construction, polarization detection means 42a may include an oscillator circuit 50, FIG. 3, frequency discriminator circuit 52, and comparator circuit 54. Oscillator 50 is connected to a pair of capacitor plates 16a, 18a, which also serve as electrodes 16 and 18, FIG. 2. Oscillator circuit 50 is tuned by the capacitor formed by plates 16a and 18a, so that any change in the capacitance of the plates resulting from a change in the dielectric constant in turn dependent upon a change in the polarization of the moving dielectric material causes a change in the output frequency of oscillator circuit 50. The change in frequency is detected by frequency discriminator circuit 52 and is compared in comparator circuit 54 to a reference such as the frequency of the circuit when the dielectric material is stationary. A signal proportional to the change indicated by comparator circuit 54 is then transmitted to velocity determination means 44a, which includes A-to-D converter circuit 56, velocity decoder circuit 58, and a velocity display 60. The signal from comparator circuit 54 indicating change in frequency is digitized by A-to-D converter 56 and transmitted to velocity decoder circuit 58, which calculates the velocity in accordance, for example, with the table above. The resulting velocity is displayed in velocity display 60.

Velocity determination means 44a may also include logic circuit 62 and volume flux display 64. The output from velocity decoder circuit 58 is arithmetically combined in logic circuit 62 with the cross-sectional area of the pipe 26, for example, to provide a readout of volume flux on display 64. Velocity determination means 44a may further include integrator circuit 66 and and additional display 68. Integrator circuit 66 sums the flow volume over a period of time and displays that total volume which is then read out on display 68.

Although the illustrations herein relate to electronic implementations of the invention, that is not a necessary limitation. For example, mechanical components may be employed and may in fact even be advantageous in situations where meters have to be replaced in existing installations.

Figure 4:
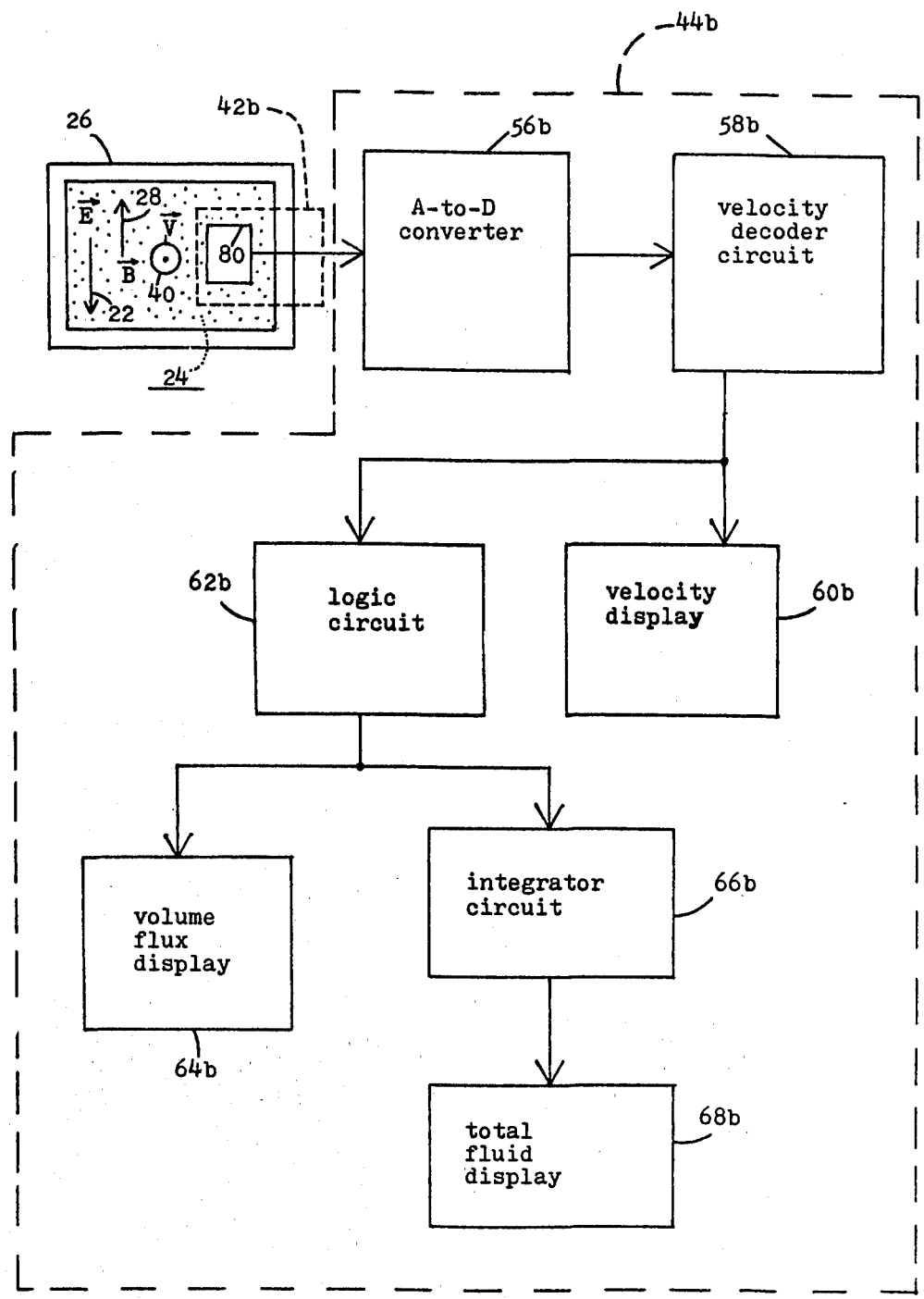
FIG. 4 is a block diagram of an alternative construction of the velocity measuring system according to this invention.

There is shown in FIG. 4 an alternative implementation according to this invention which employs an electric field sensing device 80 embedded in fluid 24 with the impressed electric and magnetic fields oriented antiparallel to each other as in the system of FIG. 2. Device 80 may be an electret mounted on a piezo-electric material which produces an electrical output signal proportional to mechanical strain produced by the torque on the electret resulting from being placed in an electric field. Alternatively, sensing device 80 may consist of a segment of wire or other electric conductor in which is induced a signal proportional to the component of the local electric field along the wire. Device 80 may be oriented so that it responds to the local electric field in any convenient spatial direction. The analog output of electric field sensing device 80 is transmitted to A-to-D converter 56b, whose output is a digital representation of a component of the electric field within the fluid, which is velocity-dependent as explained earlier. Velocity decoder 58b calculates directly the fluid velocity corresponding to the measured value of electric field and causes that velocity to be read out in display 60b. The volume flux may be provided in display 64b and the total fluid volume over a period of time may be read out in display 68b as explained previously with respect to FIG. 3.

Although thus far the invention has been explained with respect to determining the velocity of a moving dielectric fluid material, that is a gas or a liquid, that is not a necessary limitation of the invention, as the invention applies as well to moving dielectric solid materials.

Figure 5:
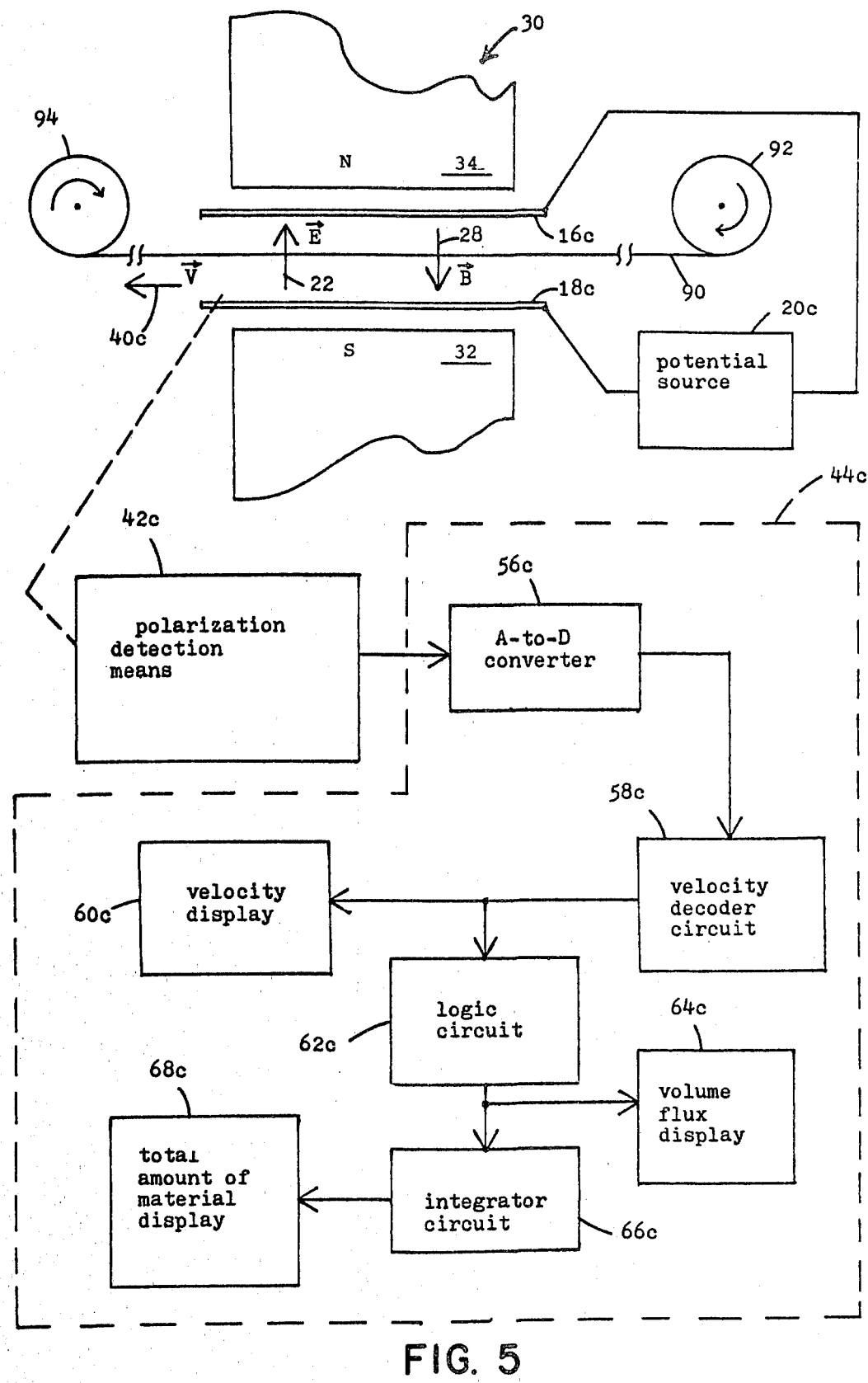
FIG. 5 is a block diagram of a velocity measuring system according to this invention used to determine the velocity of a solid dielectric material.

For example, as shown in FIG. 5, a solid web of material such as paper or cloth 90 delivered from roll 92 and taken up on roll 94 may be coursed between a pair of electrodes 16c, 18c, which also function as capacitor plates. The impressed electric field $\vec{E}$ is provided by potential source 20c connected to plates 16c and 18c, and the impressed magnetic field $\vec{B}$ is provided by poles 32, 34 of magnet 30. The electric and magnetic fields are chosen to be anti-parallel in this typical implementation, but this is not a necessary limitation of the invention. Other relative field orientations are also possible. A web of dielectric material 90 moves through the electric and magnetic fields in the direction shown by arrow 40c with a velocity $\vec{V}$. With electrodes 16c and 18c also functioning as capacitor plates, polarization detection means 42c operates as previously explained to produce an indication of the change in capacitance resulting from the velocity $\vec{V}$. This value is then used by velocity determination means 44c to calculate the velocity V as previously explained. In this manner the velocity and quantity of a moving sheet of dielectric material may be determined and displayed.

Figure 6:
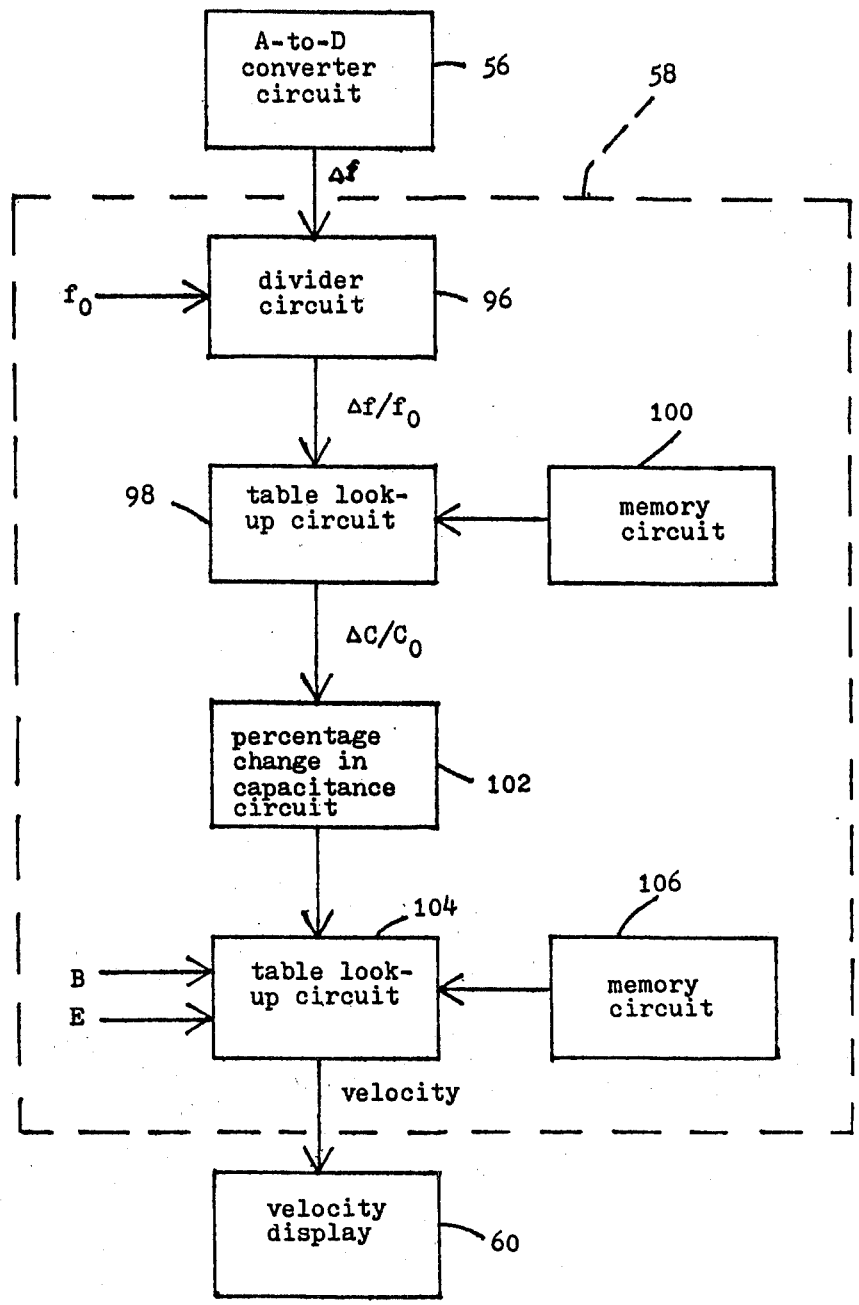
FIG. 6 is a more detailed block diagram of a velocity decoder circuit.

Velocity decoder circuit 58 may be a digital computing circuit which calculates the flow velocity from the measured change in capacitance and the known values of E and B by using for example, the equation above which relates the ratio (BV/E) and the fractional change in capacitance. In one embodiment, FIG. 6, velocity decoder circuit 58 includes divider circuit 96 which computes the fractional change in frequency $\Delta f/f_o$, where $f_o$ is the frequency of the oscillator 50 when the dielectric material is stationary, and $\Delta f$ represents the change in frequency measured by comparator circuit 54. Memory circuit 100, which may be, for example, magnetic or semiconductor in nature, contains a table of values associating a given fractional change in frequency of oscillator 50 with the corresponding change in the capacitance which tunes oscillator 50. These data may be calculated or determined empirically and stored in memory circuit 100. The output of table look-up circuit 98 is a digital representation of the fractional change in capacitance $\Delta c/c_o$, where $c_o$ is the capacitance with a stationary dielectric material. The percentage change in capacitance is computed in circuit 102, whose digital output is transmitted to another table look-up circuit 104. Memory circuit 106 includes a table which associates a given percentage change in the capacitance with the corresponding velocity of the dielectric material. The values of B and E enter this table look-up operation and are accordingly shown being delivered to circuit 104. The data stored in memory 106 may be determined experimentally and/or analytically by using a formula such as the one above. The output of circuit 104 is the velocity of the dielectric material, which is transmitted to velocity display 60.

Figure 7:
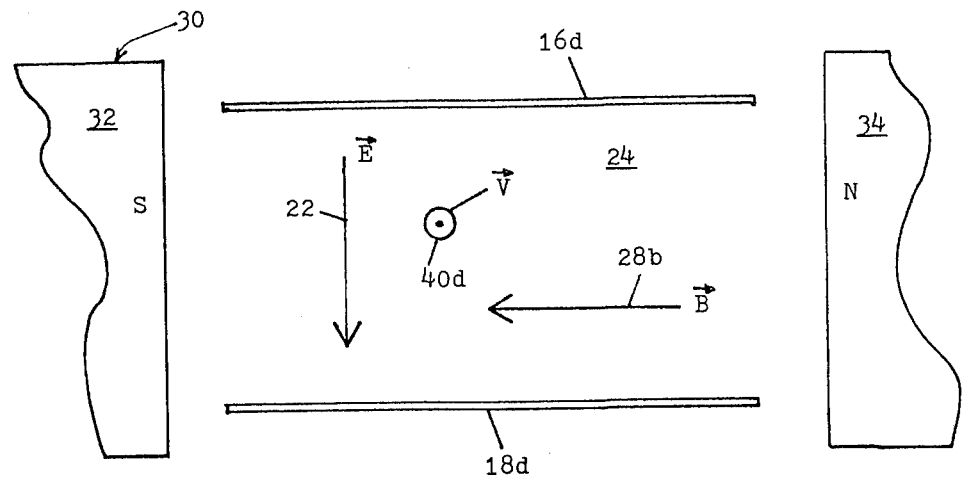
FIG. 7 illustrates an alternative relative spatial orientation of the electric and magnetic fields according to this invention in which these fields are mutually perpendicular.
Figure 8:
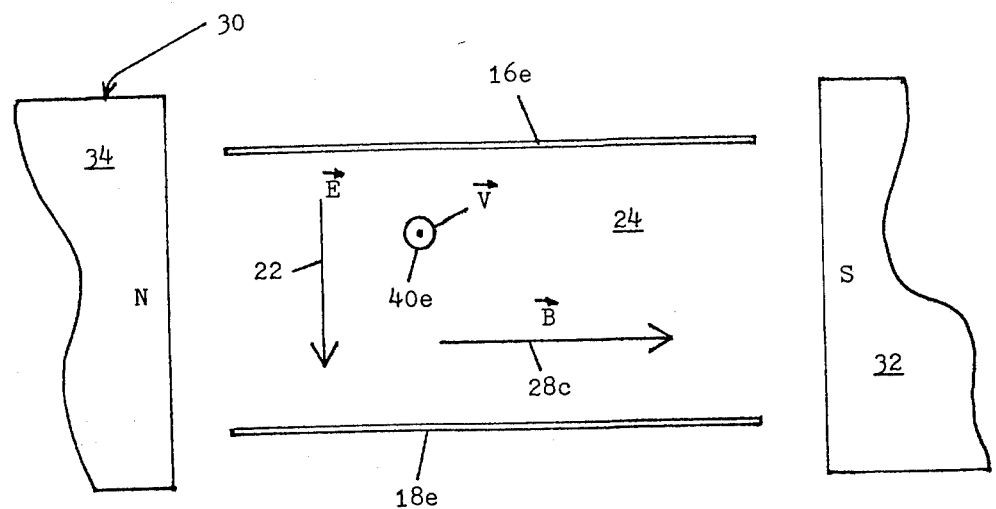
FIG. 8 illustrates another alternative relative orientation of the electric and magnetic fields.

The anti-parallel orientation of the electric and magnetic fields illustrated in FIGS. 2, 3, and 5 serves to depolarize the dielectric material as its velocity increases; that is, the velocity-dependent torque produced by the magnetic field is oppositely directed to the torque produced by electric field. Other relative field orientations are possible, however, which may produce different effects. FIG. 7 illustrates an implementation in which the electric and magnetic fields are mutually perpendicular. In this case the velocity dependent magnetically induced torque acts in a direction which assists the effect of the electric field; that is, in the system of FIG. 7 the magnetic field serves to increase the polarization of the moving dielectric material. In FIG. 8, the electric and magnetic fields are again mutually perpendicular, but the direction of $\vec{B}$ has been reversed relative to FIG. 7. In this case, the magnetic field acts to depolarize the moving dielectric material as it did when oriented anti-parallel to $\vec{E}$.

Figure 9:
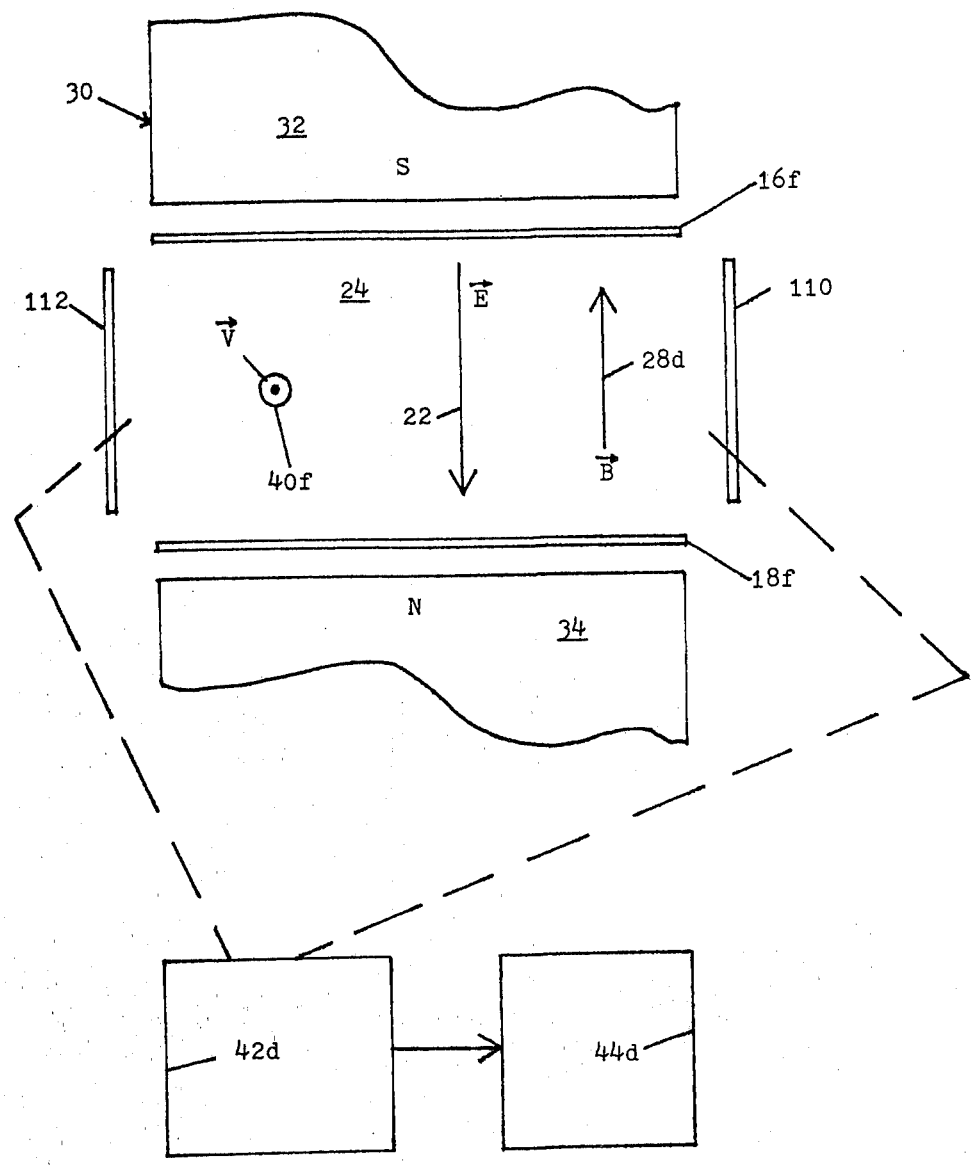
FIG. 9 illustrates an alternative electrode arrangement for sensing the change in polarization of the material induced by the magnetic field in the moving dielectric material.

For systems in which the polarization detection means 42 includes means by which capacitance is measured, it is not necessary that the electrodes used to produce the electric field $\vec{E}$ at 22 be the plates of a capacitor whose value is measured. An alternative implementation similar to FIG. 2 is shown in FIG. 9 in which electrodes 16f and 18 f serve to produce the electric field $\vec{E}$ at 22. In addition, another set of electrodes 110, 112 are included which form the plates of a capacitor with dielectric fluid 24 between them. The capacitor formed by this system is shown connected to polarization detection means 42d.

Figure 10:
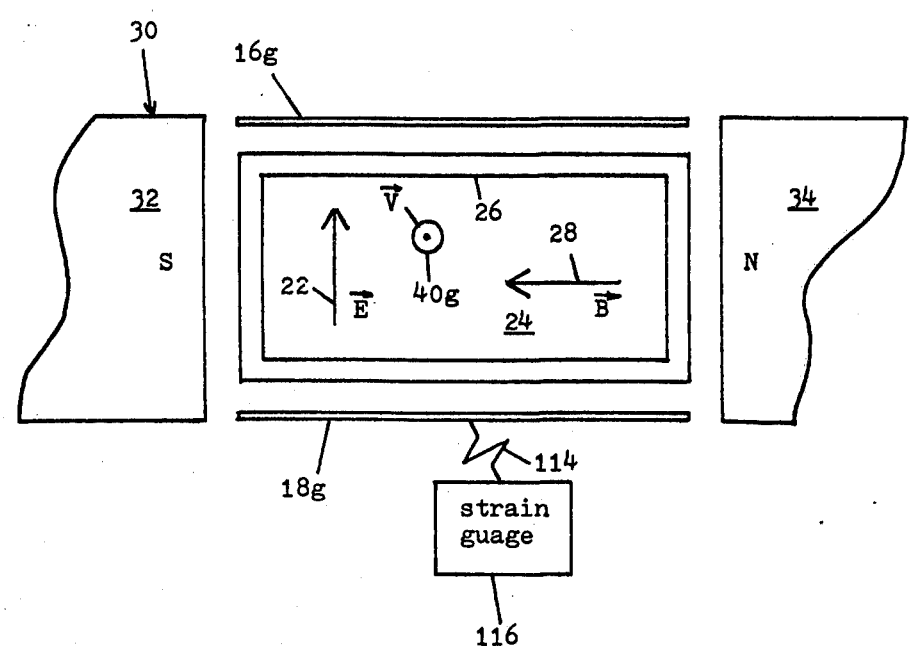
FIG. 10 illustrates another alternative implementation of the invention.

In another alternative implementation similar to that of FIG. 4 the electric field sensor 80, FIG. 10, is replaced by mechanical strain gauge 116. Strain gauge 116 is shown mechanically connected to plate 18g by line 114 and serves to measure the attractive force between plates 16g and 18g. The attractive force between these plates depends upon (among other factors) the state of polarization of the dielectric material between them, or, equivalently, upon the material's dielectric constant. In a liquid dielectric, for example, the force between charged conductors decreases compared to its value measured in vacuum by a factor equal to the stationary liquid's dielectric constant if the charge on each conductor is held constant. If, on the other hand, the voltages are held constant under the same conditions, the forces between conductors increases by a factor equal to the dielectric constant. The analog output of strain gauge 114 thus serves to measure the effective dielectric constant of the material between plates 16g and 18g. In the implementation of FIG. 10, all remaining elements in the polarization detection means and velocity decoder means may be the same as in FIG. 4. Unlike FIG. 4, however, in which the electric and magnetic fields were anti-parallel to each other, the implementation of FIG. 10 shows E and B perpendicular to one another. The relative orientation of these fields is such that the velocity-dependent torque on the atomic or molecular dipole moments tends to depolarize the material; that is, the velocity-dependent magnetic effect tends to offset the effect of the electric field. This was also the case in the implementation of FIG. 4 with a different field orientation.

Other embodiments will occur to those skilled in the art and are within the following claims:

What is claimed is:

1. Apparatus for measuring the velocity of a moving dielectric material comprising:
   means for establishing an electric field within the dielectric material to polarize the material;
   means for establishing a magnetic field within the dielectric material to induce a velocity-dependent torque on the electric dipole moments tending to align the electric dipole moments perpendicular to both the direction of motion of the dielectric material and to the direction of the magnetic field;
   means for detecting the change in the polarization of the moving dielectric material induced by the magnetic field; and
   means, responsive to the detected change in the polarization, for determining the velocity of the moving dielectric material.

2. The apparatus of claim 1 in which said means for establishing an electric field includes a set of spaced electrodes.

3. The apparatus of claim 2 in which said means for establishing an electric field includes a source of electric potential for energizing said electrodes.

4. The apparatus of claim 1 in which said means for establishing a magnetic field includes a permanent magnet.

5. The apparatus of claim 1 in which said means for establishing a magnetic field includes an electromagnet.

6. The apparatus of claim 1 in which said means for establishing a magnetic field includes a solenoid.

7. The apparatus of claim 1 in which said means for detecting polarization includes means for measuring capacitance.

8. The apparatus of claim 1 in which said means for determining velocity includes a velocity decoder circuit.

9. The apparatus of claim 1 in which said magnetic field is antiparallel to the electric field.

10. The apparatus of claim 1 in which said magnetic field is perpendicular to the electric field.

11. The apparatus of claim 1 in which said magnetic field is parallel to the electric field.

12. The apparatus of claim 1 in which the electric field is constant in time.

13. The apparatus of claim 1 in which the electric field is time varying.

14. The apparatus of claim 1 in which the magnetic field is time varying.

15. The apparatus of claim 1 in which the magnetic field is constant in time.

16. The apparatus of claim 1 in which said means for detecting polarization includes means for measuring the dielectric constant of the dielectric material.

17. The apparatus of claim 1 in which said means for detecting polarization includes means for measuring the local electric field within the dielectric material.

18. The apparatus of claim 1 in which the dielectric material is a solid.

19. The apparatus of claim 1 in which the dielectric material is a fluid.

20. A method of measuring the velocity of a moving dielectric material comprising:
    establishing an electric field within the dielectric material to polarize the material;
    establishing a magnetic field within the dielectric material to induce a velocity-dependent torque on the electric dipole moments tending to align the electric dipole moments perpendicular to both the direction of motion of the dielectric material and to the direction of the magnetic field;
    detecting the change in the polarization of the moving dielectric material induced by the magnetic field; and determining the velocity of the moving dielectric material in response to the detected change in the polarization.

21. Apparatus for measuring the velocity of a solid dielectric material comprising:
- means for establishing an electric field within the dielectric material to polarize the material;
- means for establishing a magnetic field within the dielectric material to induce a velocity-dependent torque on the electric dipole moments tending to align the electric dipole moments perpendicular to both the direction of motion of the dielectric material and to the direction of the magnetic field;
- means for detecting the change in the polarization of the moving dielectric material induced by the magnetic field; and
- means, responsive to the detected change in the polarization, for determining the velocity of the moving dielectric material.

22. Apparatus for measuring the velocity of a moving dielectric fluid comprising:
- means for establishing an electric field within the dielectric fluid to polarize the fluid;
- means for establishing a magnetic field within the dielectric fluid to induce a velocity-dependent torque on the electric dipole moments tending to align the electric dipole moments perpendicular to both the direction of motion of the dielectric fluid and to the direction of the magnetic field;
- means for detecting the change in the polarization of the moving dielectric fluid induced by the magnetic field; and
- means, responsive to the detected change in the polarization, for determining the velocity of the moving dielectric fluid.

23. Apparatus for measuring the volume flux of a moving dielectric material comprising:
- means for establishing an electric field within the dielectric material to polarize the material;
- means for establishing a magnetic field within the dielectric material to induce a velocity-dependent torque on the electric dipole moments tending to align the electric dipole moments perpendicular to both the direction of motion of the dielectric material and to the direction of the magnetic field;
- means for detecting the change in the polarization of the moving dielectric material induced by the magnetic field; and
- means responsive to the detected change in the polarization for determining the volume flux of the moving dielectric material.

24. Apparatus for measuring the total volume over a period of time of a moving dielectric material, comprising:
- means for establishing an electric field within the dielectric material to polarize the material;
- means for establishing a magnetic field within the dielectric material to induce a velocity-dependent torque on the electric dipole moments tending to align the electric dipole moments perpendicular to both the direction of motion of the dielectric material and to the direction of the magnetic field;
- means for detecting the change in the polarization of the moving dielectric material induced by the magnetic field; and
- means responsive to the detected change in the polarization for determining the volume of the moving dielectric material for a period of time.

25. Apparatus for measuring the flow of a moving dielectric fluid, comprising:
- means for establishing an electric field within the dielectric fluid to polarize the fluid;
- means for establishing a magnetic field within the dielectric fluid to induce a velocity-dependent torque on the electric dipole moments tending to align the electric dipole moments perpendicular to both the direction of motion of the dielectric fluid and to the direction of the magnetic field;
- means for detecting the change in the polarization of the moving dielectric fluid induced by the magnetic field; and
- means, responsive to the detected change in the polarization, for measuring the flow of the moving dielectric fluid.

* * * * *